United States Patent [19]

Lloyd, Jr. et al.

[11] Patent Number: 4,542,808
[45] Date of Patent: Sep. 24, 1985

[54] ORDER FILLING SYSTEM

[75] Inventors: Harry J. Lloyd, Jr., Stanley; Hoyt W. Huggins, Leawood, both of Kans.; Michael R. Lyon, Kansas City, Mo.; David N. Thayer, Shawnee, Kans.; William E. McGovney, Kansas City, Mo.

[73] Assignee: House of Lloyd, Inc., Grandview, Mo.

[21] Appl. No.: 509,295

[22] Filed: Jun. 30, 1983

[51] Int. Cl.⁴ .............................................. E04H 3/04
[52] U.S. Cl. ...................................... 186/56; 186/58; 221/2; 221/21; 221/268; 209/564; 414/134
[58] Field of Search ...................... 186/7, 8, 14, 19–21, 186/26–29, 32, 33, 35, 36, 52, 55, 56, 58, 68; 221/2, 4, 21, 245, 258, 268; 209/563, 564; 198/339, 341; 414/134, 136

[56] References Cited

U.S. PATENT DOCUMENTS

| | | | |
|---|---|---|---|
| 2,570,918 | 10/1951 | Chodziesner | 186/55 |
| 3,200,934 | 8/1965 | Payn et al. | 221/258 X |
| 3,247,929 | 4/1966 | Langley | 186/56 |
| 3,746,130 | 7/1973 | Bullas | 186/56 |
| 3,920,100 | 11/1975 | Dunphy | 186/56 X |
| 4,299,326 | 11/1981 | Ulch | 209/564 |
| 4,354,613 | 10/1982 | Desai et al. | 221/4 |

*Primary Examiner*—Joseph J. Rolla
*Attorney, Agent, or Firm*—Litman, Day and McMahon

[57] ABSTRACT

An order filling apparatus includes an elongated belt conveyor having a bin-on switch and a bin-off switch at opposite ends thereof. A plurality of item dispensers are positioned along the conveyor, and each dispenser is loaded with a single type of item. An order filling control computer has a bus cable extending along the conveyor, and each dispenser has a dispenser control board connected to the bus. Each control board includes an address decoder and circuitry for relaying command signals from the controller to the dispenser and for generating status signals indicating the operational status of the dispenser. A conveyor travel encoder provides a position signal indicative of conveyor travel. The controller stores orders to be filled with items. An order filling method includes a conveying item receptacle bins past the dispensers to receive items therefrom. As each bin engages the bin-on switch, an order is activated and associated with the bin. The controller is operative to track each bin on the conveyor, detect the presence of each bin at a dispenser loaded with items called for by the order associated therewith, control the dispenser to dispense a quantity of items required by the associated order, detect whether each attempt to dispense an item actually occurs, deactivate each order as the associated bin engages the bin-off switch, and effect the printing of a report listing any items which were called for but not dispensed.

22 Claims, 8 Drawing Figures

ORDER FILLING SYSTEM

FIELD OF THE INVENTION

The present invention relates to article handling systems, and more particularly, to an automated high volume split case order filling system.

BACKGROUND OF THE INVENTION

In many order filling operations, orders are filled for quantities of full cases or cartons of items. In such an operation, it is only necessary to gather the required number of cases together, apply shipping labels to the cases, and transfer the cases to a shipping dock. A supplier of goods to merchants for resale might operate in such a manner.

In contrast, consumer orders for merchandise often consist of one or several each of a plurality of items, that is, less than a full case of items. In processing such an order, it is necessary to count out the required number of items from a case thereof, group the various items together, send the group to a packing station, and from there to a shipping dock. As the number of different items carried by such supplier increases and as the volume of orders increases, it is difficult to run the operation efficiently if a large amount of human handling of the orders is required.

Efforts to reduce the amount of human activity in the filling of orders include the use of conveyors, receptacles or bins on the conveyors to group the items of an order, coded markings on the bins, sensors to read the coded markings, timers in combination with limit type switches, and mechanical and electrical analogs of order filling systems including digital computers.

SUMMARY OF THE INVENTION

The present invention provides a method and apparatus which greatly improves the efficiency of high volume split case order filling operations. In particular, a conveyor conveys item receptacle bins corresponding to orders past a plurality of item dispensers, each dispenser being loaded with a single type of item. As each empty bin enters the conveyor, a new order is activated and associated therewith. A computer controller monitors the positions of the bins on the conveyor and, with information of the position of each dispenser along the conveyor, detects the presence of the bins at the dispensers which are loaded with items called for in the orders corresponding to the bins. Upon detecting such presence, the controller commands the dispenser to dispense a number of times called for in the associated order.

Each dispenser has a logic circuit board through which the controller monitors and controls the dispenser. One of the monitored functions is whether an item was dispensed in response to a dispense command. With this information, the controller prints a report for each order listing items which were not dispensed. As each bin leaves the order filling conveyor, the order associated therewith is deactivated.

OBJECTS OF THE INVENTION

The principal objects of the present invention are to provide an improved system for grouping items to fill split case orders; to provide such a system which greatly increases the efficiency of high volume filling of orders for a variety of small quantities of items; to provide such a system which advances the degree of automation in the filling of split case orders; to provide such a system requiring minimal skills of the majority of workers thereon; to provide such a system including an order filling computer which stores orders and monitors and controls a conveyor and a plurality of item dispensers positioned along the conveyor to dispense items into appropriate item receptacle bins moving along the conveyor; to provide such a system which groups items of orders according to the size and weight of items in the order such that the group of items fits a standard size of shipping carton; to provide such a system wherein neither the speed of conveyor travel nor the positioning of the dispensers along the conveyor is critical to the dispensing of items into the proper bin; to provide such a system wherein conveyor travel is monitored in increments thereof and wherein the positions of dispensers along the conveyor is measured in terms of such increments from a conveyor reference point; to provide such a system capable of detecting, recording, and reporting whether actual dispenses of items occur; to provide such a system wherein the preferred type of dispenser is a stepping belt conveyor operated by a linear stroke motor; to provide such a system wherein each dispenser includes sensors for monitoring the position of the ram of the motor, a dispense or drop detector sensor, and logic circuitry including an address decoder for providing status signals indicative of the ram position and a dispense occurrence and for receiving a dispense command from the controller; to provide such a system wherein the controller computer is connected to the logic circuitry of the dispensers by a signal bus cable, the controller communicating with a selected dispenser by outputting a unique address thereof; to provide such a system wherein the identity and position of each dispsener on line can be determined by a routine in which a special bin is conveyed past the dispensers and includes shields operative to actuate the drop detector of each dispenser; to provide such a system wherein the controller computer is interfaced with a host computer and receives orders for filling therefrom; and to provide such a split case order filling system which is economical to manufacture, accurate and efficient in operation, capable of long operating life, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE FPREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail

The reference numeral 1 generally designates a split case order filling system according to the present invention. The order filling system 1 generally includes a conveyor 2 on which item receptacle bins 3 are conveyed past item dispensers 4. Each of the dispensers 4 is loaded with a single type of article or item 5. The system 1 is monitored and controlled by an order filling controller or computer 6. Each of the bins 3 is associated with a customer order or a segment of an order for a plurality of types of items 5. The system 1 conveys bins 3 past the dispensers 4, detects the presence of a bin at dispensers loaded with items called for in the order associated with the bin, dispenses items from such dispensers, detects whether items have actually been transferred, and prints a report for each bin listing any failures to transfer items called for by the associated order and possibly a packing list. In general, the purpose of the system 1 is to group items of customer orders for subsequent packing and shipping. However, other applications are possible, such as the grouping of articles of a kit for assembly, the grouping of surgical utensils for a surgical kit, and similar groupings of articles.

Figure 2A:
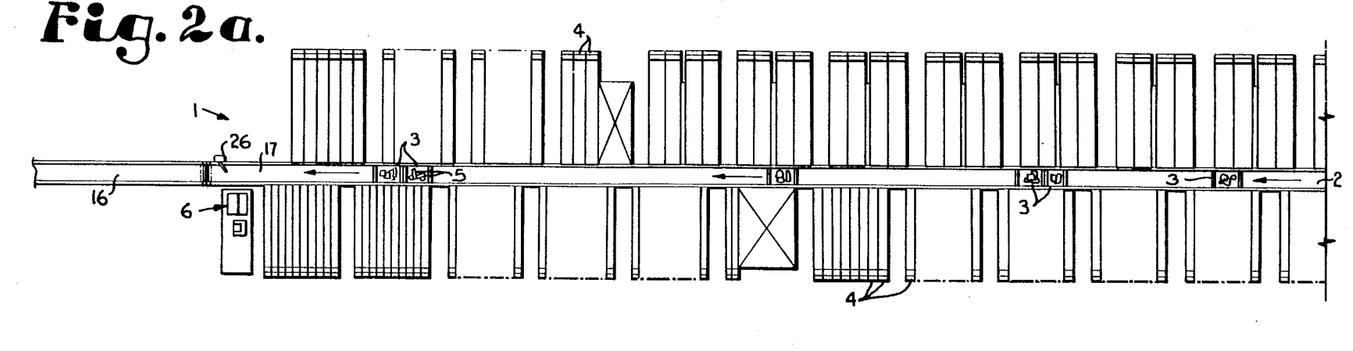
FIGS. 2a and 2b are halves of a diagramatic plan view at a greatly reduced scale illustrating the order filling system according to the present invention.
Figure 2B:
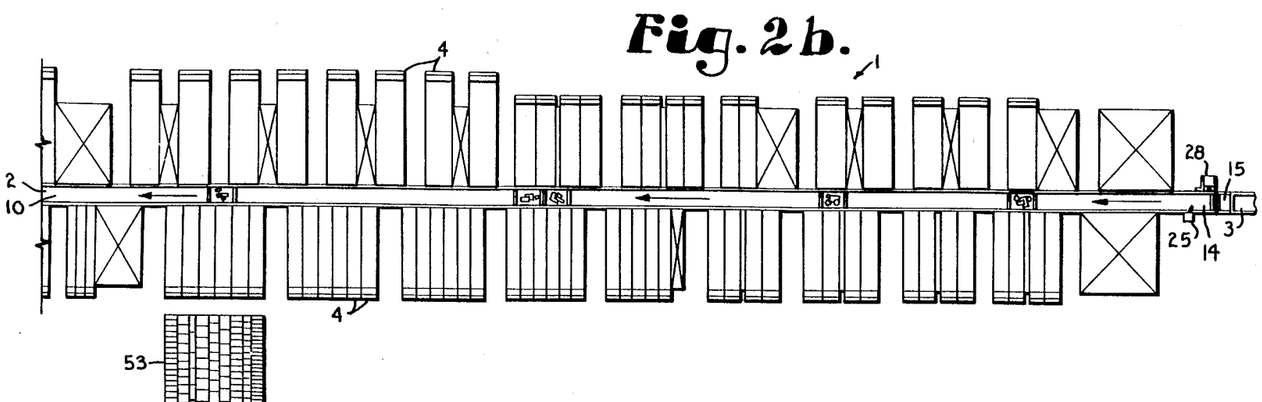

The preferred conveyor 2 is a belt conveyor including a conveyor belt 10 extending between a conveyor motor 11 (FIG. 5) at one end and an idler roller (not shown) at another end with support rollers 12 (FIG. 3) spaced therealong to support the upper and lower runs of the conveyor belt 10. The conveyor 2 receives the bins 3 at an entrance end 14 by manual loading of bins or preferably from a bin supply conveyor 15 (FIG. 2b) and may be manually unloaded from the conveyor 2. Preferably, the conveyor 2 connects with a conveyor for transfer of the bins to further processing operations, such as a packing conveyor 16 at an exit end 17 of the conveyor 2 (FIG. 2a). The packing conveyor 16 conveys the filled bins 3 toward a packing station (not shown) where the items of each bin are packed for shipment.

The item receptacle bins 3 may be any type of container which is suitably sized and shaped to retain the items 5 therein. Preferably, the bins 3 are formed of a durable and somewhat resilient plastic. The height of side walls 20 of the bins is selected to accommodate a total volume of items which fits in the largest standard size of shipping carton which is normally employed by package delivery services. The dispensers 4 are spaced apart across the conveyor 2 to clear the bins therebetween. The dispensers are mounted at a height to allow exit ends 21 of the dispensers to overlap the sides 20 of the passing bins to assure that the items are transferred into the bins. The lower wall or floor 22 of each bin may be padded (not shown) to lessen the possibility of breakage of the items 5 dropping into the bins. After the bins are emptied for packing of the items therein, the bins are returned to a bin supply station (not shown) by means such as a bin return conveyor 23.

It is not always possible to pack all the items of a customer order in a single carton. In such cases, the orders are segmented, that is, broken down into order portions or segments. The spatial dimensions and weight of each item handled by the system are measured. Each order segment is limited to a combination of items whose spatial dimensions do not exceed the dimensions of the shipping carton employed and whose weight does not exceed the allowable weight for the carton. Another criterion for segmenting the orders is the quantity of any item in relation to the number of shipping cartons required for the total order. For example, if eight units of an item were required for an order having four segments, the eight items would be divided among the segments as two items per segment. By this means, two dispenses of the item per bin would be required for each of four bins rather than eight dispenses of the item into one bin. Such segmentation increases the processing speed of the system 1 and results in fewer drop errors.

In order to dispense the correct items 5 into the correct bins 3 associated with an order, it is necessary to track the bins on the conveyor 2 and detect the presence of each bin at the proper dispenser 4. As each empty bin enters the conveyor 2 from the bin supply conveyor 15, the bin engages a bin-on sensor or switch 25 connected to the order filling controller 6. In response to operation of the switch 25, an order within the controller 6 is associated with the bin which operated the switch. At the exit end 17 of the conveyor 2, a similar bin-off sensor or switch 26 is located to sense the bins 3 exiting from the order filling conveyor 2. The switches 25 and 26 are similar and may be conveyor type limit switches. One requirement of the switches 25 and 26 as employed in the system 1 is that the switches must be suitable for engagement by the bins 3 when the bins are in end-to-end contact along the conveyor 2.

The positions of the bins along the conveyor 2 may be monitored by any suitable means. One possible position monitoring method is the use of timers. However, such methods would tend to be very complex and generally require that the conveyor 2 operate at a constant speed and continuously. In the order filling system 1, the position of each bin is monitored in terms of conveyor travel length increments, and the position of each dispenser is measured in such increments. The conveyor travel increments are monitored by a shaft encoder 28 which is mechanically engaged with the conveyor belt 10 and electrically connected to the controller 6. The conveyor travel encoder 28 may be any type of conventional encoder operative to monitor the rotation of a shaft. The illustrated encoder 28 generates a pulse for each increment of rotation of a shaft (not shown) engaged with the conveyor belt 10. The increments of shaft rotation correspond to increments of linear travel of the conveyor belt 10. The encoder 28 is connected to the controller 6 which counts or otherwise responds to the encoder pulses or "clicks". The position of each dispenser 4 in relation to the bin-on switch 25 is determined in terms of a number of conveyor travel increments. By this means, the presence of a particular bin 3 at a particular dispenser 4 may be detected by knowing the distance of the dispenser from the bin-on switch 25 in terms of conveyor travel increments and by counting the increments traveled by the bin 3. In a preferred embodiment of the system 1, the conveyor travel increments have a length of about 2 inches. The resolution of the increments may be coarser or finer as determined by the requirements of the system.

Figure 3:
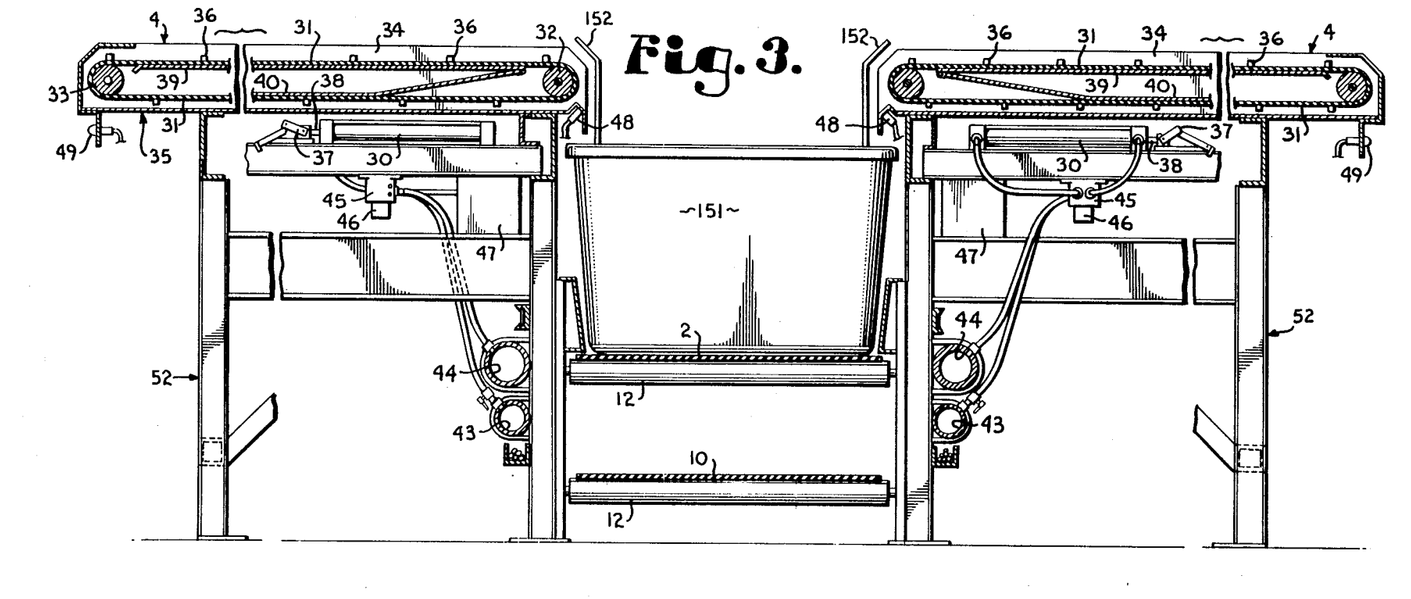
FIG. 3 is an enlarged fragmentary cross-sectional view illustrating details of the central conveyor, item dispensers, and a special bin for determining the positions of the dispeners along the conveyor of the system.

The item dispensers 4 may be any type of apparatus which can be controlled to dispense selected quantities of items. The illustrated dispensers 4 are stepping belt conveyors driven by linear stroke pneumatic cylinders 30. A more complete description of the preferred dispenser mechanisms 4 is given in a co-pending application Ser. No. 523, 344, filed Aug. 15, 1983, and entitled Power-Driven Conveyor. Referring to FIG. 3, each dispenser 4 includes an endless belt 31 trained about inward and outward rollers 32 and 33. The rollers 32 and 33 are rotatably mounted between side members 34 of a dispenser frame 35. The belt 31 is provided with transverse cleats or partitions 36 which separate items on the dispenser 4 and provide a catch for a pawl mechanism 37 on the ram member 38 of the pneumatic cylinder to thereby transfer the driving force of the cylinder 30 to the belt 31. The pawl 37 raises upon the extension of the ram 38 to thereby engage one of the cleats 36 and lowers to clear the cleats upon retraction of the ram 38. The cleats 36 are evenly spaced along the belt 31, and the stroke of cylinder 30 is adjusted to equal the spacing between two adjacent cleats 36. By this means, each extension of the ram 38 of the cylinder 30 advances the belt 31 a distance equal to the spacing between the cleats 36. The belt 31 is additionally supported on the top run by a dispenser bed member 39 and on the lower run by a backing plate 40 which prevents the lower run of the belt 31 from raising out of contact with the pawl mechanism 37 upon engagement thereby.

The pneumatic cylinders 30 are preferably double-acting cylinders and receive air under pressure from an air supply conduit 43 extending along either side of the conveyor 2. Air is exhausted from the cylinders 30 into a vent pipe 44 also extending along both sides of the conveyor 2. Air flow to each cylinder 30 is controlled by a solenoid operated pneumatic valve which is reversible to allow either extension or retraction of the ram of the cylinder 30. The solenoid 46 which operates the valve 45 is controlled by logic circuitry located within a dispenser control box 47 or elsewhere on the dispenser 4 and which is connected to the order filling controller 6. Each dispenser 4 includes a photoelectric drop detector 48 positioned at an inward end of the dispenser. The drop detector 48 senses the actual dispensing of an item from the dispenser 4 upon blockage of light illuminating the drop detector 48 by an item being transferred from the dispenser belt 31. Each dispenser may be provided with a dispenser indicator light 49 positioned at the outward end of the dispenser 4.

Figure 4:
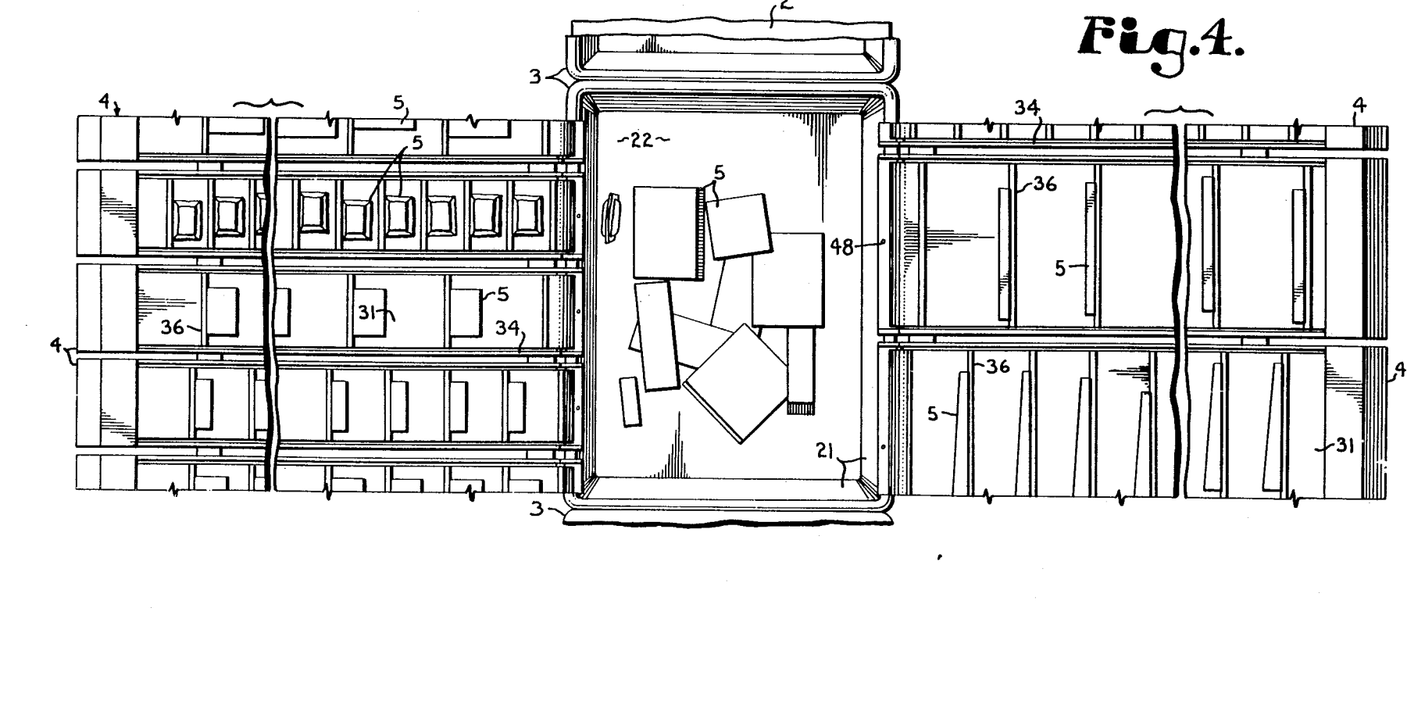
FIG. 4 is a fragmentary plan view illustrating a bin and several dispensers of the order filling system.

The dispensers 4 are positioned in groups along both sides of the conveyor 2 to make the most efficient use of available space and access to the conveyor 2. The dispensers are supported at a level above the level of the conveyor 2 by dispenser support racks 52 which form the groups of dispenser. The support racks 52 may be any suitable structure or framework. The items on the dispensers 4 are replenished from gravity feed racks 53 (FIG. 2b) which support a plurality of full cases of items dispensed by a group of dispensers 4. Preferably, the dispensers are arranged in groups with spaces between the groups in such a manner that a worker can reach all of the positions on the dispensers of a group in order to replace items which have been dispensed therefrom. As illustrated in FIG. 4, most of the dispensers 4 are loaded with a single item between each adjacent pair of cleats 36. However, it is desirable to load some dispensers with multiples of items in order to minimize the number of dispenses required to dispense any given quanitity of items. In this manner, a quantity of a particular item can be dispensed as a small combination of singles and multiples rather than a large number of single dispenses. Such an arrangement is necessary because of the relatively slow operation of the pneumatic cylinders 30 in comparison to the length of the bins 3 and the normal speed of the conveyor 2.

Figure 5:
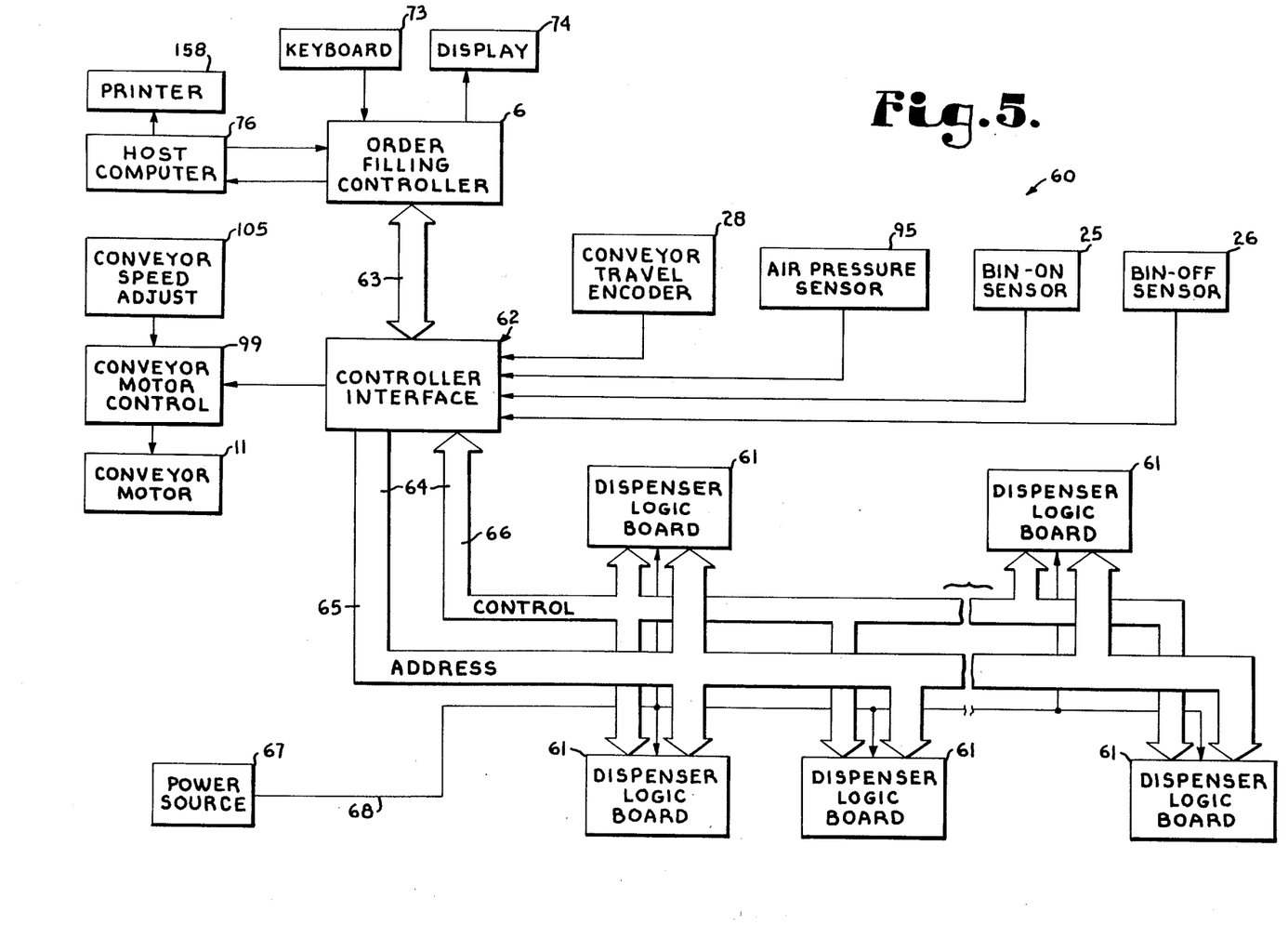
FIG. 5 is a block diagram illustrating the principal functional portions of the control system for the order filling system.

FIG. 5 illustrates an order filling control system 60 including the order filling controller 6 and a plurality of dispenser logic boards or circuits 61, each of which is mounted in a control box 47 (FIG. 3) of an associated dispenser 4. Each dispenser logic board 61 responds to selected signals from the controller 6 and locally controls the mechanical operation of the associated dispenser. The board 61 also monitors and reports the readiness of the dispenser to dispense items and the success of a command from the controller to dispense an item. The dispenser logic boards 61 are interfaced to the controller 6 by a controller interface circuit 62. The interface 62 is connected to an input/output (I/0) port 63 of the controller 6 and to the dispenser logic boards 61 over a signal bus 64. The signal bus 64 may be a ribbon cable and is divided into an address bus 65 and a control bus 66. The dispenser logic boards 61 are individually addressed by the controller 6 to enable the boards to respond to commands or have their status signals read. The dispenser logic boards 61 are also interconnected with a power source 67 over a power bus 68.

Figure 1:
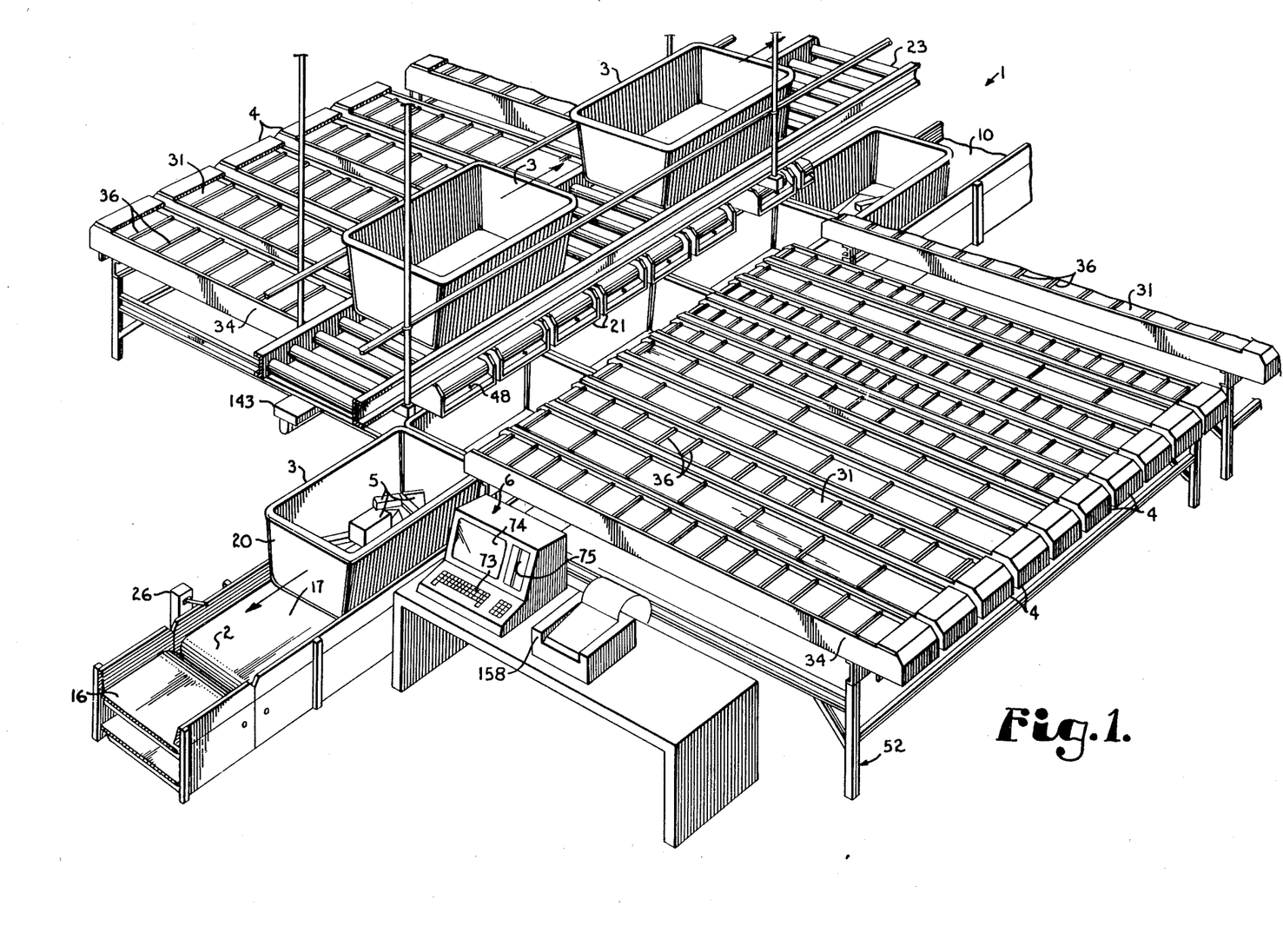
FIG. 1 is a fragmentary perspective view illustrating a portion of a split case order filling system according to the present invention.

The illustrated order filling controller 6 is a general purpose digital computer and preferably includes a key board 73 for operator input and a CRT display 74. The controller 6 may be any of a number of types of conventionally available microcomputers operating under conventional operating systems. The controller 6 executes an order filling control program to control operation of the system 1. The controller 6 may be configured either for stand-alone operation wherein orders are entered directly to the controller by the keyboard 73 or a floppy disk drive 75 (FIG. 1) or for cooperation with a host computer 76 wherein the orders for items 5 are communicated from the host computer 76 to the controller 6. The host computer might, for example, be an accounting and inventory computer of the distributor operating the order filling system 1. In the illustrated control system 60, the controller 6 cooperates with a host computer 76.

Figure 6:
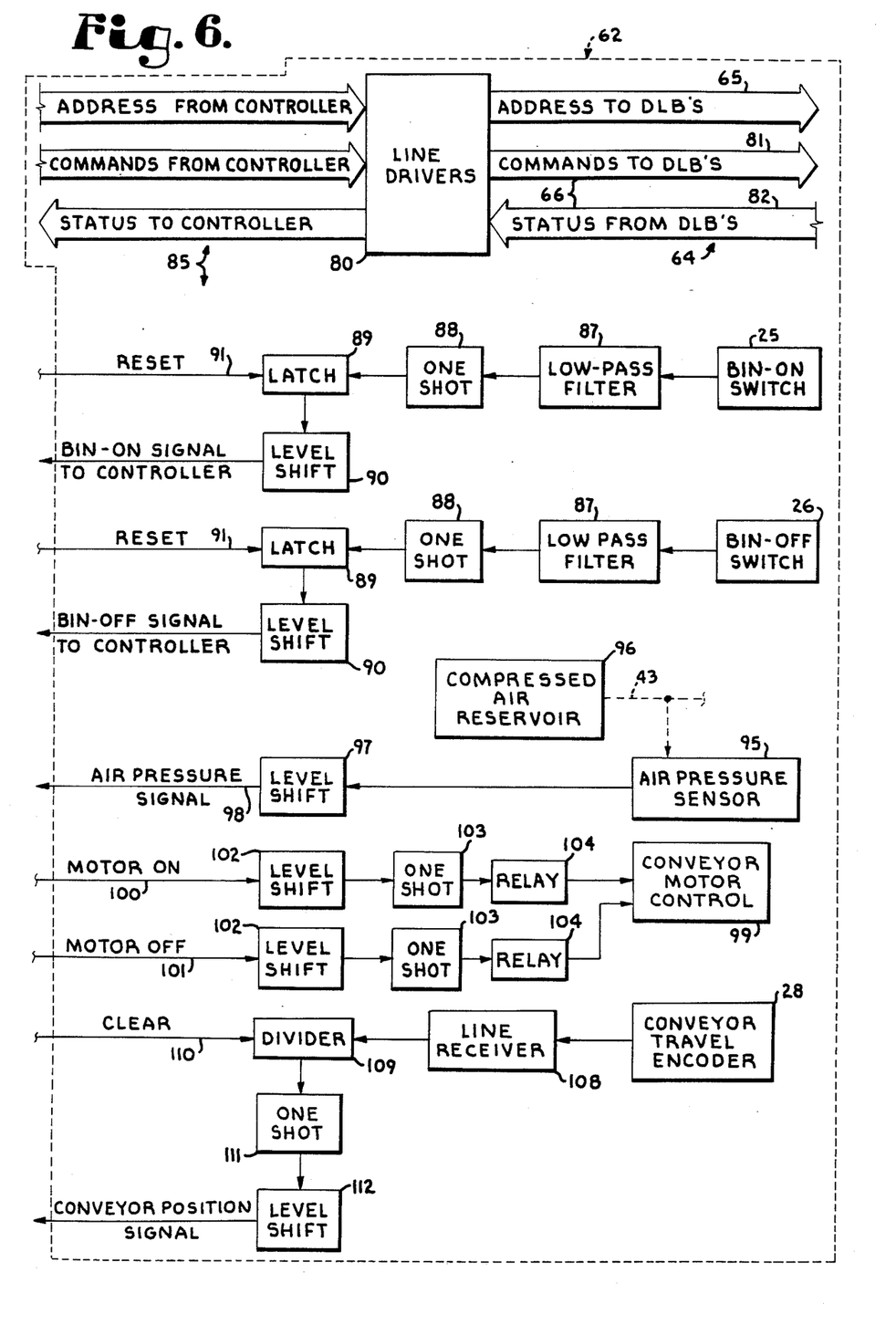
FIG. 6 is a block diagram illustrating details of interface circuitry for interfacing a signal bus to the controller of the system.

Referring to FIG. 6, the controller interface circuit 62 in general conditions signals to and from the controller 6. Signal amplifiers or line drivers 80 are required on all the lines of the signal bus 64 because the cable extends at least the entire length of the conveyor 2. The drivers 80 strengthen the outgoing and incoming signals to compensate for degradation of the signals by the resistance of the length of the bus 64 and by noise likely to be on such long lines. Connectors (not shown) are provided at spaced locations along the bus 64 for connection of the dispenser logic boards 61 thereto. As shown in FIG. 6, the control bus 66 may be divided into a command bus 81 to carry commands from the controller 6 to the boards 61 and a status bus 82 carrying status signals from the dispensers 4 to the controller 6.

The interface 62 connects the signal bus 64 to the input/output lines 85 of the I/0 port 63. The I/0 port 63 may be created by any of a number of conventionally available interface control circuits known as programmable peripheral interface circuits, peripheral interface adapters, and the like. Such circuits or chips are connected to the processing bus of the computer 6 and are decoded at a small block of addresses within the memory map of the controller 6. The controller writes or outputs dispenser addresses and dispenser commands and inputs or reads dispenser status signals through the port 63 as data words.

The interface 62 handles signals from the bin-on and bin-off switches 25 and 26, the position signals from the conveyor travel encoder 28, conveyor motor control signals, and an air pressure monitor signal. The bin monitor circuits are similar, and each includes the bin-on switch 25 or bin-off switch 26, a low pass filter 87, a one-shot circuit 88, a latch 89, and a level shift circuit 90. The bin switches 25 and 26 are momentary contact switches and switch a DC level only as long as engaged by a bin 3. The low pass filters 87 are unresponsive to all signals above a selected frequency to thereby remove noise from the bin signals. The one-shots 88 restore squareness to at least the leading edge of the bin signals to more positively set the latches 89. The latches hold a DC output level upon being set, the output levels being shifted by the level shifters 90 to an appropriate level for the I/0 port 63. After the controller 6 has read the bin signals, the latches 89 may be cleared or reset by way of reset lines 91.

The controller 6 monitors the pneumatic system 94 (FIG. 7) which provides compressed air to operate the pneumatic cylinders 30 which power the dispensers 4. An air pressure sensor 95 is pneumatically connected to the air supply conduit 43 or a compressed air reservoir 96 supplying air thereto. The air pressure sensor 95 is connected through a level shifter 97 and an air pressure signal line 98 to the I/0 port 63. The air pressure signal may be monitored and a message displayed on the CRT 74 regarding the status of the pneumatic system 94 at start-up of the order filling system 1 or if air pressure should be lost during operation. The conveyor motor 11 may also be controlled by the controller 6. As illustrated, a conveyor motor control circuit 99 is connected between the motor 11 and a motor-on signal line 100 and a motor-off signal line 101. Each of the lines 100 and 101 has a level shift circuit 102, a one-shot circuit 103, and a relay 104 therein. The speed of the conveyor motor 11 may be controlled independently of the controller 6 by means of a conveyor speed adjust control 105 (FIG. 5).

The illustrated conveyor travel encoder 28 provides a conveyor position signal consisting of a selected number of pulses per revolution of a roller in contact with the belt 10 of the conveyor 2. The encoder 28 is connected through an amplifier or line receiver 108 to a binary counter/divider 109 which is operative to output a pulse upon counting a selected number of pulses received from the encoder 28. Thus, the divider 109 in effect divides the pulse frequency of the encoder signal to provide pulses at a more desirable frequency. The divider may be a fixed type of divider wherein the frequency divisor is set or may be a programmable type to provide any desired resolution. Whenever the conveyor 2 is started up and at certain other times, it is desirable to start the count of the divider 109 at zero. Therefore, a clear line 110 is provided to conduct a clear or reset signal from the controller 6 through the I/0 port 63. The pulses from the divider 109 are passed through a one-shot 111 and a level shift circuit 112 to provide the conveyor position signal in a form readable by the controller 6 through the I/0 port 63.

The dispenser logic boards 61 are connected in parallel to the conductors of the signal bus 64. The illustrated address bus 65 includes eight conductors. The control bus 66 includes a dispense command line 116, a lamp-off line 117, and a lamp-on line 118 in the command portion 81 thereof and a drop signal line 119 and a ready line 120 in the status portion 82 thereof. In order for each board 61 to respond only to signals intended for it, each board 61 includes an address decoder 123 connected to the address bus 65 and which responds to a unique address code. The decoder 123 may be any of several types of decoders such as a group of exclusive-OR gates (not shown). Each decoder 123 is programmed to respond to a unique address code by means such as an address header 124. The header 124 may consist of a plug, such as a dual-in-line package (DIP) plug. Selected pins on a mating socket are operatively connected to plus and minus conductors of the power source 67 to define a binary word of logic levels identical to the address code of the associated dispenser. The output of the address decoder 123 is connected to an enable line 125. Upon decoding the associated address code, a selected logic condition is placed on the enable line 125 allowing the dispenser logic board 61 to respond to the commands on the command lines 116, 117 and 118 and allowing the status signals on the status lines 119 and 120 to be read by the controller 6.

The principal functions of each dispenser logic board 61 are: to control operation of the pneumatic cylinder 30 of the associated dispenser in response to a dispense command on the dispense line 116; to control operation of the dispenser indicator lamp 49 in response to lamp commands on the lamp control lines 117 and 118; to generate a drop signal on the drop line 119 in response to a combination of a signal from the drop detect photo-resistor 48 and the dispense command; and to generate a ready signal on the ready line 120 in response to sensing that the ram 38 of the cylinder 30 is in a ready position thereof. The signals on the command lines 116, 117, and 118 are present on the command bus 81, and thus, are available to any of the boards 61 whenever the controller 6 outputs such command signals. The command signals are directed to a selected board 61 by the controller 6 outputting the associated address code substantially simultaneously with one of the command signals. In contrast, the drop and ready signals of the lines 119 and 120 are not actually present until the board 61 is enabled by the associated address code.

Figure 7:
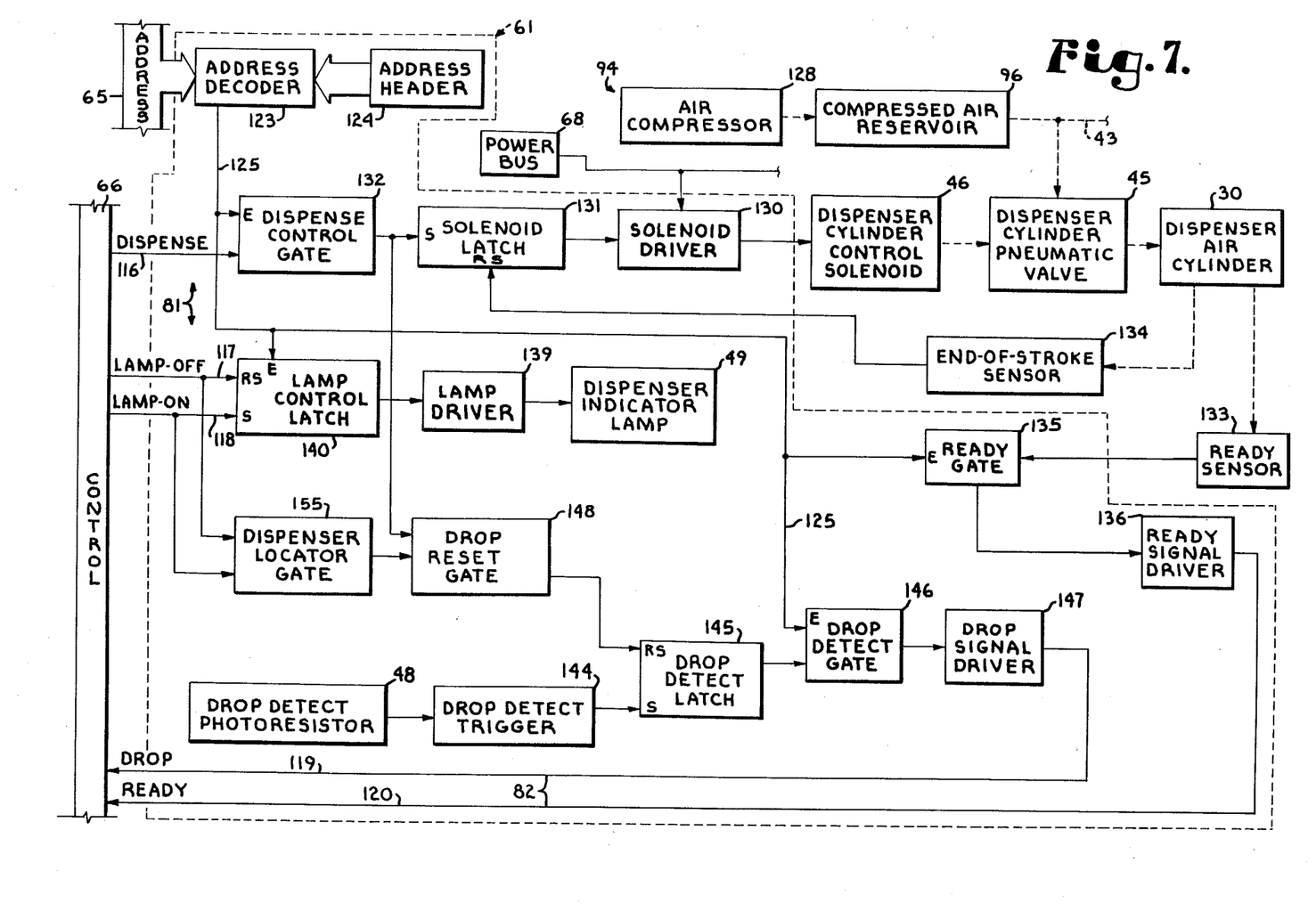
FIG. 7 is a block diagram illustrating details of logic circuitry employed to control each item dispenser.

Referring to FIG. 7, the order filling system 1 includes an air compressor 128 which supplies air under pressure to the reservoir or tank 96. The reservoir 96 feeds air to the dispenser pneumatic cylinders 30 through the air supply conduits 43. Air flow is controlled by the valves 45 which are actuated by the solenoids 46. Electrical current is supplied from the power bus 68 to the solenoids 46 of each dispenser 4 by a solenoid driver 130 which may be transistor or a combination of transistors. The power bus 68 also supplies current to the electronic components of each dispenser logic board 61 preferably through a filter (not shown) which prevents transients on the power bus 68 from reaching and possibly falsely actuating the logic circuits of the boards 61. The driver 130 is switched by a solenoid control latch circuit 131, the state of which is set by a dispenser control gate 132. The gate 132 has the dispense line 116 and the enable line 125 connected thereto and provides a solenoid latch setting signal in response to a combination of the dispenser address code on the address bus 65 and the dispense command on line 116.

The positions of the ram 38 of each cylinder 30 are sensed by a ready sensor 133 which senses the retracted position of the ram and an end-of-stroke sensor 134 which senses the extended position of the ram. The end-of-stroke sensor 134 is connected to the solenoid latch 131. Upon sensing the ram 38 in the extended position, the sensor 134 generates a signal which resets the latch 131 thereby unbiasing the solenoid driver 130. By this means, the solenoid 36 is deactivated and, preferably being a spring return solenoid, reverses the state of the valve 45 whereby the pressurized air is applied to the cylinder 30 to retract the ram 38. The ready sensor 133, upon sensing the retracted position of the ram 38, places a logic level on an input of a ready gate 135. Upon receiving an enable signal from the enable line 125 connected thereto, the gate 135 outputs a ready signal to the ready line 120 through a ready signal driver 136 to be read by the controller 6.

The preferred ram position sensors 133 and 134 are Hall effect devices and cooperate with one or two magnets (not shown) mounted on each pawl mechanism 37. The ready Hall effect device 133 is positioned for activation by a magnet on the pawl 37 in the retracted position of the ram 38; and similarly, the end-of-stroke Hall effect device 134 is positioned for activation in the extended position of the ram 38. Fixed placement of the sensors 133 and 134 is preferred to placement thereof on the pawl mechanism 37 because the sensors have conductors extending therefrom.

The dispenser indicator lamps 49 are provided on the illustrated dispensers 4 for convenient identification of dispensers from the keyboard 73 of the controller 6. For example, if a particular dispenser repeatedly failed to report a ready status or repeatedly recorded drop errors, such a condition might be displayed on the CRT 74. In response, an operator could enter the address code of the dispenser and a lamp-on command to illuminate the indicator lamp 49 of the dispenser to quickly identify the malfunctioning dispenser so that corrective measures could be taken. Similarly, the lamp 49 may be extinguished by a lamp-off command along with the correct address code. The lamp 49 is powered by a lamp driver 139 which is biased by a lamp control latch circuit 140. The latch 140 has the lamp control lines 117 and 118 of the command bus 81 connected thereto. A lamp control command on one of the lines 117 and 118 coincident with an enable signal on the enable line 125 from the local decoder 123 is operative to change the state of the latch 140 and, therefore, the state of illumination of the lamp 49. The lamp control signals have an additional function which will be described further hereinbelow.

The drop detect photo-resistors 48 cooperate with a source of light to detect the fall of dispensed items 5 into the bins 3 in response to dispense commands for generation of the drop signals on the drop status lines 119. The source of light may be ambient light within the installation of the system 1. More positive drop detection is ensured by a light source such as the fluorescent lights 143 (FIG. 1) installed above the conveyor 2, as on the lower side of the bin return conveyor 23. Each photoresistor 48 is connected to a drop detect trigger circuit 144. Preferably, the trigger 144 is a sliding threshold type of circuit such that an output signal is triggered only in response to sharp changes in light level. By this means, the drop detectors are made less sensitive to gradual changes in sensed illumination from such causes as aging of the fluorescent tubes 143, the collection of dust on the photoresistors 48, and the like. Each dispenser 4 is illustrated as having a single drop detector 48. However, depending upon the width of a dispenser, it might be desirable to employ two or three photoresistors 48 to ensure positive drop detection.

The trigger 144 is connected to a drop detect latch 145 and provides a setting signal thereto. Upon being set, the latch 145 makes the drop signal available at its output. The latch 145 is connected to a drop detect gate 146 and through a drop signal driver 147 to the drop status line 119 of the status bus 82. Upon being enabled by an enable signal on the line 125, the drop status signal is placed on the drop status line 119. The drop detect latch 145 is normally reset to remove the drop signal from the output thereof by a reset signal from a drop reset gate 148. The gate 148 is connected to the output of the dispense control gate 132 and derives the reset signal from the dispense command. Thus, the latch 145 is reset just prior to dispensing an item such that less time is provided for false signals to be generated.

The order filling system 1 is capable of determining the position of each dispenser 4 using the conveyor travel encoder 28, a special dispenser locator bin 151, the drop detect circuitry of each dispenser logic board 61, and the controller 6. The special bin 151 is provided on both sides with light shields 152 (FIG. 3) which actuate the drop detector of each dispenser as the bin 151 passes by. The program which operates the system 1 includes a routine for locating the dispensers using the special bin 151.

A drop detect latch reset command is output on the command bus 81 which causes the resetting of the drop detect latch 145 of each board 61. The command consists of a simultaneous lamp-on command and a lamp-off command without addressing any of the boards 61 and is detected on each board by a dispenser locator gate 155 connected to the lamp-off and lamp-on lines 117 and 118. Since none of the boards 61 are addressed, no enable signal is generated on the enable line 125, such that the reset command does not affect the lamp 49. The dispenser locator gate 155 on each board is connected to the drop reset gate 148; and upon receiving the reset command from the controller 6, the gate 155 outputs a signal to the gate 148 which in turn sends a reset signal to the drop detector latch 145.

Following the simultaneous resetting of all the latches 145, the special bin 151 is placed on the conveyor 2. When the bin 151 engages the bin-on switch 25, the controller 6 begins counting pulses from the conveyor travel encoder 28. A dispenser locator program routine defines or establishes a dispenser offset table in the memory of the controller 6. As the shields 152 of the bin 151 pass between the fluorescent lights 143 and the drop detect photoresistor 148 of each dispenser 4, the drop detect latch 145 thereof is set, thereby making a drop signal available at the output thereof. Periodically, the controller polls the boards 61 by outputting each dispenser address code and checking the drop status line 119 thereof. If the bin 151 has passed a dispenser, as evidenced by the voltage level on the drop status line thereof, the controller stores the current pulse count in the dispenser offset table in association with the address code for the dispenser. The controller then sends a lamp-on command to the dispenser which recorded a drop signal to illuminate the associated lamp 49. The lighting of the lamp 49 is observed by workers standing along side the system 1 and provides visual feedback that the position of a dispenser has been recorded. The light of the lamp 49 of a dispenser should coincide with the passage of the bin 151 thereby. If such coincidence does not occur, that is, if the lamp 49 lights substantially before or after the bin 151 passes by a dispenser, the dispenser number or the address code is noted for later manual entry of the dispenser location at the key board 73 of the controller 6.

A routine is provided in the control program to allow manual determination of the positions of the dispensers by measuring the distance in conveyor travel increments from the bin-on switch 25 to each dispenser and entry of the distance and the address of the dispenser into the controller 6. Thus, use of the special bin 151 is not necessary to the practice of the invention, but is a convenient means of determining the positions of the dispensers, particularly when a large number of dispensers are present in the system 1.

During a dispenser locator run, all the boards 61 are preferably polled once for each pulse from the encoder 28 for the greatest accuracy. The illustrated controller 6 is operating at a master clock frequency of four megahertz or greater such that no problems should be encountered as long as the number of dispensers 4 in the system 1 is not excessive. With the eight bits of the illustrated address bus 65, a theoretical maximum of 256 dispensers can be accommodated by the illustrated system 1. Actually, at least one code, such as all logic zeros, should be assigned for use when no dispenser is to be addressed.

As disclosed above, the control program which operates the system 1 establishes a dispenser offset table which associates each dispenser address code with a dispenser offset or distance in conveyor travel increments of each dispenser 4 from the bin-on switch 25. The controller 6 stores a backlog of orders or segments of orders for items 5 so that as each empty bin 3 engages the bin-on switch 25, an order is available to process. The control program stores the orders as order tables. Each order table is identified by an order number which corresponds to an order number of a customer order. Each table includes a dispenser column, a quantity column, a current offset column, a drop error column, and may include other columns such as the time of day that the items are dispensed. The entries of each row of an order table correspond to the dispenser in that row or to the items dispensed thereby.

The dispenser column includes entries for the address code of the dispenser of each item called for by the order. Preferably, the host computer 76 translates the catalog numbers for ordered items into dispenser address codes. However, it is also possible for the controller 6 to perform such translation. Each quantity entry in the quantity column initially corresponds to the number of items to be dispensed by the corresponding dispenser. As items are dispensed from a particular dispenser, the corresponding quantity entry is decremented to keep track of the quantity of items still needed to be dispensed.

The dispenser offset column initially includes entries of the positions of the corresponding dispensers in conveyor travel increments. Upon the entry of an order into the controller 6 or upon the activation of the order, the controller 6 fills in the dispenser offsets for each dispenser listed in the order by reference to the dispenser offset table. Each time the controller receives a pulse from the conveyor travel encoder 28, the control program causes each offset entry of each active order table to be decremented and checks the current value of the offset entries. When an offset entry has been decremented to a selected nagative valve, the program determines that the bin 3 corresponding to the order is in front of the dispenser having the selected negative offset and that the bin is positioned to receive items. The offset entries are decremented to a negative value rather than to zero principally to assure that the front edge of the bin 3 has passed the dispenser to avoid the possibility of dispensing an item in front of the correct bin.

Prior to sending a dispense command to any dispenser 4, the control program addresses the dispenser and checks the ready line 120 for the ready signal, indicating that the ram 38 of the corresponding cylinder 30 is fully retracted. If the cylinder 30 is reactivated before being fully retracted, it is possible that the pawl mechanism 37 would not engage a cleat 36 such that a drop error would occur. Because of the operating speed of the controller 6 relative to the speed of the cylinder 30, it is possible for the controller 6 to cycle through dispensers needing dispense commands and return to a given dispenser for the next dispense before the ram thereof has completely retracted. The ready signal allows the controller to skip over non-ready dispensers and to return on the next or subsequent cycles. When a ready signal is sensed from a dispenser, the dispenser is addressed and the dispense command is issued. If an item is present at the end of the dispenser, upon the advancement of the dispenser belt 31, the item is dropped into an awaiting bin 3. Upon passage of the items past the drop detector 48, the corresponding drop detect latch is set. Subsequent to issuing the dispense latch command to a dispenser, the controller 6 checks the drop status line 119 for the dispenser. If a drop error signal is present, the control program adds a drop error to the error entry corresponding to the dispenser in the current order.

The controller 6 continues to dispense items from a dispenser listed in an order until the corresponding quantity entry has been decremented to zero or until the corresponding offset entry has been decremented to a second selected negative value which indicates that the bin corresponding to the order has been conveyed past the dispenser. The order tables should be constructed in such a manner that a bin is never conveyed past a required dispenser before the called-for quantity of items has been dispensed. To help prevent such an occurrence, some dispensers are loaded with multiples of certain items between each adjacent set of cleats 36. Thus, when an order calls for more than a selected quantity of such items, the corresponding order table is constructed to cause a combination of dispenses of singles and multiples of the item which adds up to the ordered quantity.

When a bin engages the bin-off switch 26, the order table associated therewith is deactivated. The bin-off switch 26 is not absolutely necessary to the operation of the system 1, and the function of detecting a bin at the exit end 17 of the conveyor 2 could be accomplished by other means, such as measuring the length of the conveyor between the bin-on switch 25 and the end 17 in conveyor travel increments and deactiviating the order table associated with a bin when the bin has traveled the required number of increments. The controller 6 then formulates a report listing any drop errors detected and the dispensers recording the errors. The report and possibly a packing list may then be printed by a printer 158. In the illustrated system, the report is communicated to the host computer 76 to which the printer 158 is connected. Alternatively, in a stand alone controller system, the printer 158 would be connected to the controller 6. The order report and packing list may be placed in the associated bin 3 for use by personnel when packing the items of the bin for shipment. Communication of the report to the host computer 76 allows the computer 76 to update inventories, back order unfilled items, and possibly bill the customer only for the items in the bin.

Specifics of the control program for the order filling system 1 are not detailed herein because it is believed that such details would occur to an ordinarily skilled prgrammer informed of the method and apparatus of the present invention. Other details of the program would be determined by the specific apparatus employed in the system 1 and by the requirements of specific controller 6 and the specific implementation of the dispenser logic boards 61 employed in the system 1.

It is to be understood that while certain forms of the present invention have been illustrated and described herein, it is not to be limited to the specific forms or arrangement of parts described and shown.

What is claimed and desired to secured by Letters Patent is as follows:

1. A method of grouping items to fill orders comprising the steps of:
   (a) positioning a plurality of item dispensers along a conveyor;
   (b) loading each dispenser with a single type of item, said dispensers collectively being loaded with a variety of types of items;
   (c) conveying an item receptacle bin past said dispensers, said bin being associated with an order for various quanties of said items;
   (d) detecting the presence of said bin at each of selected dispensers which are loaded with items defined by the order associated with said bin by the steps of:
      (1) ascertaining the position of each dispenser along said conveyor in terms of an offset distance equal to a number of increments of conveyor travel of a selected length from a first reference point on said conveyor;
      (2) constructing an order table in a computer memory for each bin, said order table including an offset entry corresponding to the offset distance of each dispenser of items required by said order; and
      (3) decrementing each offset entry of said table in response to each increment of travel of said bin; and
   (e) dispensing a required quantity of items from a dispenser in response to the offset entry associated with said dispenser being decremented to a selected value.

2. A method as set forth in claim 1 including the steps of:
   (a) detecting whether an actual transfer of each item from a selected dispenser into a bin takes place in response to an attempt to dispense said item;
   (b) recording each occurence of a drop error, said drop error being a failure to dispense an item called for by an order; and
   (c) printing a drop error report for each order in which drop errors occur listing the items not dispensed.

3. A method as set forth in claim 1 including the steps of:
   (a) defining an item quantity table for each order, said quantity table including a quantity entry corresponding to each dispenser of items required by said order;
   (b) decrementing a quantity entry in response to each occurence of the dispensing of an item by the dispenser corresponding to said quantity entry; and
   (c) continuing to dispense items from said dispenser corresponding to said quantity entry until said quantity entry has been decremented to zero.

4. A method as set forth in claim 1, including:
   (a) measuring the spatial dimensions of each type of item dispensed;
   (b) dividing each order into order segments, each order segment being limited to a group of items which can be packed within a selected size of shipping carton;
   (c) associating each order segment with a single bin; and
   (d) dispensing items into said single bin according to an associated order segment.

5. A method as set forth in claim 1 including the step of:
   (a) conveying a plurality of said bins past said dispensers in substantially touching end-to-end relationship.

6. A method as set forth in claim 1 wherein said dispensers are positioned at unknown distances from a first reference point on said conveyor, said method including determining the respective positions of said dispensers in relation to said first reference point by the steps of:
   (a) defining a dispenser offset table listing a unique dispenser code for each dispenser and associating with said code an entry position in said table for a dispenser offset indicating the position of said dispenser in relation to said first reference point;
   (b) conveying a dispenser locator bin past said dispensers on said conveyor;
   (c) monitoring the travel of said locator bin on said conveyor by detecting each increment of conveyor travel of a selected length;
   (d) detecting the passage of said locator bin past said first reference point and past a second reference point;
   (e) upon detecting said locator bin at said first reference point, initiating a count of conveyor travel increments and continuing to count said increments until said locator bin passes said second reference point;
   (f) detecting the presence of said locator bin at each of said dispensers; and
   (g) upon detecting the presence of said locator bin at a dispenser, entering the current count of said conveyor travel increments in said dispenser offset table in association with the dispenser code for said dispenser, said current count constituting a dispenser offset for said dispenser.

7. A method as set forth in claim 1 including the steps of:
   (a) monitoring the travel of said bins on said conveyor by detecting each increment of conveyor travel of a selected length;

(b) upon the passage of a bin past a first reference point on said conveyor, defining an active order table associated with said bin and an order for items, said table listing each dispenser of items called for by said order, an offset entry for each dispenser, and a quantity entry for each dispenser; said offset entry being equal to the number of conveyor travel increments the dispenser associated therewith is located from said first reference point and said quantity entry being equal to the quantity of items dispensed by said dispenser which is called for by said order;

(c) in response to each detected increment of conveyor travel, sequentially decrementing each offset entry of the active order table associated with each bin positioned on said conveyor between said first reference point and a second reference point on said conveyor;

(d) in response to each offset entry of an active order table being decremented to a first selected value, signalling the dispenser associated with said offset entry to dispense an item, said item being received in the bin associated with said active order table;

(e) decrementing the quantity entry associated with each dispenser which is signalled to dispense an item; and (f) continuing to dispense items from each dispenser associated with an offset entry which has been decremented to said first selected value until the first of the quantity entry associated with said dispenser is decremented to zero or the offset entry associated with said dispenser is decremented to a second selected value.

8. A method as set forth in claim 7 wherein:

(a) each of said dispensers is operatively connected to a signal bus including an address bus and a control bus and includes an address decoder responsive to a unique address code;

(b) said active order tables lists the dispensers of items called for by the orders associated therewith by listing the respective address codes of said dispensers; and (c) each dispenser is signalled to dispense by generating the addresss code associated with said dispenser on said address bus and a dispenser command on said control bus.

9. A method as set forth in claim 8 including the steps of:

(a) at each dispenser, sensing the mechanical readiness of said dispenser to dispense items;

(b) generating a ready signal having a first logic level upon said dispenser being ready to dispense items and a second logic level upon said dispenser not being ready to dispense items;

(c) upon generating an address code for a selected dispenser, sensing the logic level of the ready signal of said selected dispenser by way of said control bus prior to generating a dispense command for said selected dispenser; and (d) generating said dispenser command for said selected dispenser only in response to sensing that the ready signal of said selected dispenser is at said first logic level.

10. A method as set forth in claim 7 including the steps (a) at each dispenser, detecting whether an actual transfer of an item from said dispenser takes place in response to being signalled to dispense and generating a drop signal having a first logic level upon detecting that an item has been dispensed and a second logic level upon detecting that an item has not been dispensed;

(b) subsequent to signalling a dispenser to dispense an item called for by an active order table, sensing the logic level of the drop signal of said dispenser; and (c) in response to sensing said drop signal is at said second logic level, listing a drop error in said active order table and associating said drop error with the dispenser which failed to dispense an item 11. An order filling system grouping items of orders comprising:

(a) an elongated conveyor including a conveyor motor;

(b) a conveyor travel encoder operatively associated with said conveyor and providing a signal pulse for each increment of conveyor travel length of an article on said conveyor;

(c) a plurality of item receptacle bins positioned on said conveyor for movement, each bin being associated with an order for a variety of items;

(d) a bin-on switch defining a first reference point on said conveyor and engaged by a bin upon entry upon said conveyor and a bin-off switch defining a second reference point on said conveyor and engaged by a bin upon exiting said conveyor;

(e) a plurality of item dispensers positioned along said conveyor, each dispenser being positioned at a selected dispenser offset distance equal to the number of said conveyor travel increments between said dispenser and said first reference point; each dispsenser being loaded with a single type of item and including a dispenser motor which is selectively operable to dispense items into bits on said conveyor;

(f) an order filling controller including a digital computer with a memory and interconnected with said conveyor travel encoder, said bin-on switch, said bin-off switch, and the dispenser motors; and (g) said computer being programmed to:
  (1) associate each bin with an order for quantities of items dispensed by selected dispensers, upon said bin engaging said bin-on switch ;
  (2) construct an order table in said memory for each order including an associated offset distance for each of said selected dispensers of said order;
  (3) decrement each of the offset entries of the order tables associated with each of the bins positioned on said conveyor between said first and second reference points for each signal pulse from said conveyor travel encoder; and
  (4) command said controller to dispense a preselected quantity of items from selected dispenser into a bin in response to the offset entry associated with said selected dispenser in the order table associated with said bin being decremented to a selected value.

12. A system as set forth in claim 11 wherein:

(a) said bins are conveyed on said conveyor in substantially touching end-to-end relationship.

13. A system as set forth in claim 11 wherein:

(a) said order filling controller is a general purpose digital computer.

14. A system as set forth in claim 11 wherein:

(a) each dispenser includes an item drop detector connected to said controller and operative to provide a drop signal indicative of the actual dispensing of an item in response to a dispense command from said controller.

15. A system as set forth in claim 14 wherein:

(a) each drop detector includes a photoelectric device, the illumination of said photoelectric device being interrupted by an item upon said item actually being dispensed, the interruption of said illumination effecting the generation of said drop signal from the dispenser associated with said drop detector.

16. A system as set forth in claim 14 wherein:
(a) said dispensers are positioned at random distances from said bin-on indicator along said conveyor;
(b) said conveyor travel encoder provides a signal pulse for each increment of conveyor travel of a selected length;
(c) said system includes a dispense locator bin for conveyance on said conveyor to determine the respective positions of said dispensers, said locator bin including drop detector actuator means thereon which is operative to actuate the drop detector of each dispenser upon the presence of said locator bin at said dispenser; and
(d) said controller is operative to count the pulses provided by said encoder and to associate each dispenser with an offset distance from said bin-on indicator equal to the count of pulses coincident with the drop signal from the drop detector of said dispenser.

17. A system as set forth in claim 16 wherein:
(a) each drop detector includes a photoelectric device, the illumination of said photoelectric device being interrupted by an item upon said item actually being dispensed, the interruption of said illumination effecting the generation of said drop signal from the dispenser associated with said drop detector; and
(b) said drop detector actuator means includes a shield operative to interrupt the illumination of each photoelectric device upon the passage of said locator bin by the dispenser associated with said photoelectric device.

18. A system as set forth in claim 11 wherein:
(a) each dispenser motor includes an extendible ram, said ram being selectively extended to effect the dispensing of an item; and
(b) each dispenser includes a ram position indicator connected to said controller and operative to provide a ram position signal indicative of the position of said ram relative to said dispenser motor.

19. A system as set forth in claim 18 wherein said ram position indicator includes:
(a) a ready indicator operative to provide a ready signal upon said ram being fully retracted; and
(b) an end-of-stroke indicator operative to provide an end-of-stroke signal upon said ram being fully extended.

20. A system as set forth in claim 11 including:
(a) a signal bus connected to said controller; and
(b) a dispenser address decoder associated with each dispenser, each address decoder responding to a unique address code and being connected to said bus whereby the dispenser motor associated with said dispenser is enabled to effect the dispensing of an item in response to said address code and a dispense command from said controller.

21. A system as set forth in claim 20 wherein:
(a) each dispenser includes an item drop detector connected to said bus and the address decoder of said dispenser and operable to provide a drop signal indicating the actual dispensing of an item by said dispenser; and
(b) said drop detector is enabled to send said drop signal to said controller in response to said address decoder receiving the address code associated with said dispenser.

22. An order filling system for grouping items of orders comprising:
(a) an elongated conveyor including a conveyor motor;
(b) a conveyor encoder operatively associated with said conveyor and provided a position signal indicative of the position of articles on said conveyor;
(c) a plurality of item receptacle bins positioned for movement on said conveyor, each bin being associated with an order for a variety of items;
(d) a bin-on indicator providing a bin-on signal indicative of the entry of a bin onto said conveyor;
(e) a plurality of item dispensers positioned along said conveyor, each dispenser being loaded with a single type of item and including a dispenser motor which is selectively operable to dispense items into said bins on said conveyor;
(f) each dispenser motor including an extendible ram, said ram being selectively extended to effect the dispensing of an item;
(g) each dispenser including a ram position indicator connected to said controller and operative to provide a ram position signal indicatvie of the position of said ram relative to said dispenser motor, said ram position indicator including:
(1) a Hall effect device operatively positioned on one of said dispenser motor and said ram; and
(2) a magnet operatively positioned on the other of said dispenser motor and said ram whereby the location of a magnetic field of said magnet is changed relative to the position of said Hall effect device in response to a change of the position of said ram relative to said dispenser motor; and
(h) an order filling controller interconnected with said conveyor motor, said encoder, said bin-on indicator, and the dispenser motors and operative to detect the presence of each bin at selected dispensers loaded with items called for by the order associated with said bin and to effect the dispensing of quantities of items from said selected dispensers as called for by the associated order.

* * * * *